March 17, 1964     C. ANDERSON     3,124,984
FRICTION WRENCH

Filed April 24, 1962     2 Sheets-Sheet 1

Christian Anderson
Inventor
by Cedric J. Porter
Attorney

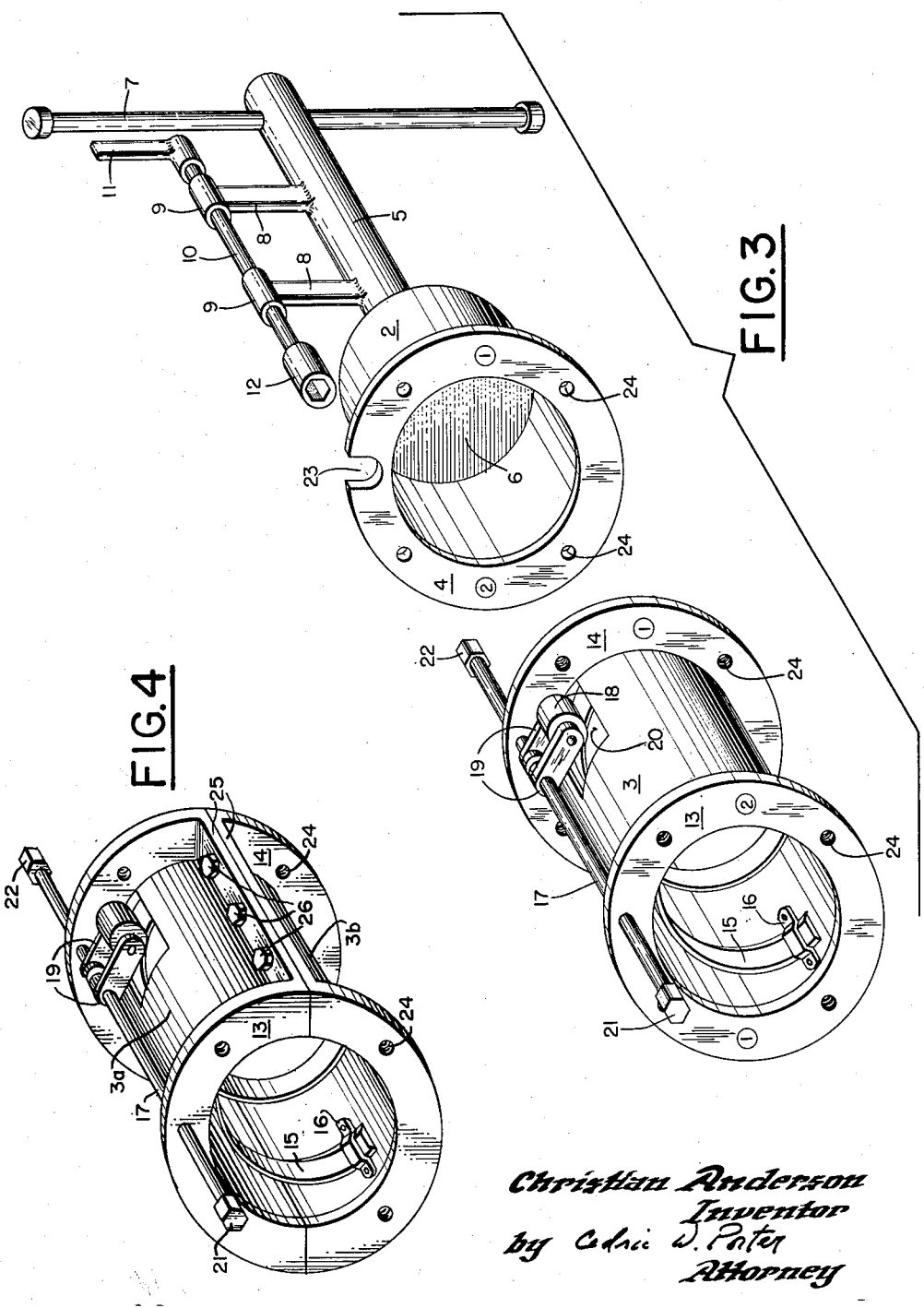

United States Patent Office 3,124,984
Patented Mar. 17, 1964

3,124,984
FRICTION WRENCH
Christian Anderson, West Baldwin, Maine, assignor to Yankee Atomic Electric Company, Boston, Mass., a corporation of Massachusetts
Filed Apr. 24, 1962, Ser. No. 189,765
12 Claims. (Cl. 81—64)

The present invention relates generally to manually operable tools and particularly to such devices for the handling of cylindrical objects and the like.

Numerous applications exist in our industrial society requiring the handling of cylindrical objects having smooth exterior surfaces without marking or otherwise damaging such surfaces. The sizes and shapes of such objects will vary as well as the degrees of accessibility. In all instances it is necessary to provide a sufficient gripping action to a smooth cylindrical surface, together with means for the application of a torque, to facilitate removal or attachment to adjacent structure. The heating, plumbing and electrical power generation industries require handling tools of the type characterized by the present invention. An example of such usage resides in the atomic energy generation field wherein housings projecting from the head of a pressurized water reactor must be removed during maintenance procedures.

Prior art devices for the handling of cylindrical objects and the like employ some form of a flexible friction-bearing holding structure, however such devices are commonly plagued with numerous inadequacies. Slippage of the holding member can often lead to serious consequences and the need exists for a positive control of such members during the apllication of the torque forces. Furthermore, it is necessary to provide a plurality of tools when the torque forces are to be applied in one direction for one application and then in the opposite direction for another.

The present invention has for its primary object the provision of a new and novel device for the handling of smooth cylindrical objects and the like.

A further object of the present invention is to provide a new and novel device for the application of torque forces to objects having smooth cylindrical surfaces.

A still further object of the present invention is to provide a new and novel device for handling smooth cylindrical surfaces with means for positive control of a flexible friction-bearing member engaging such surfaces.

Another object of the present invention is to provide a unitary device for the application of torque forces to objects having smooth cylindrical surfaces wherein such forces may be applied in any desired direction.

Still another object of the present invention is to provide a new and novel device for the application of torque forces to smooth cylindrical objects and the like which is highly efficient and easily operable.

A primary feature of the present embodiment of the invention resides in a flexible friction-bearing holding member contained within a reversible body section having positive means for holding the flexible member in contact with the smooth cylindrical surfaces during the application of torque forces. The reversible body section facilitates the application of a torque in any desired direction and the flexible member will be maintained in the desired position to thereby avoid many of the disadvantages found in prior art devices.

Additional objects, features and advantages of the invention will best be understood after consideration of the following detailed description and reference to the accompanying drawings, wherein:

FIG. 3 is an exploded view illustrative of the method of assembling the embodiment of the invention.

FIG. 4 is a view of a portion of the tool of the invention, in a modified form.

Figure 1:
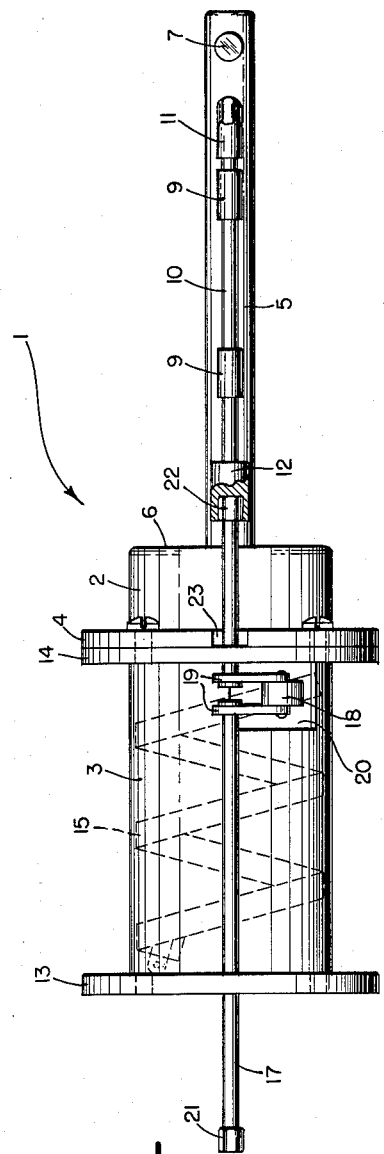
FIG. 1 is a plan view of the illustrative embodiment of the invention.
Figure 2:
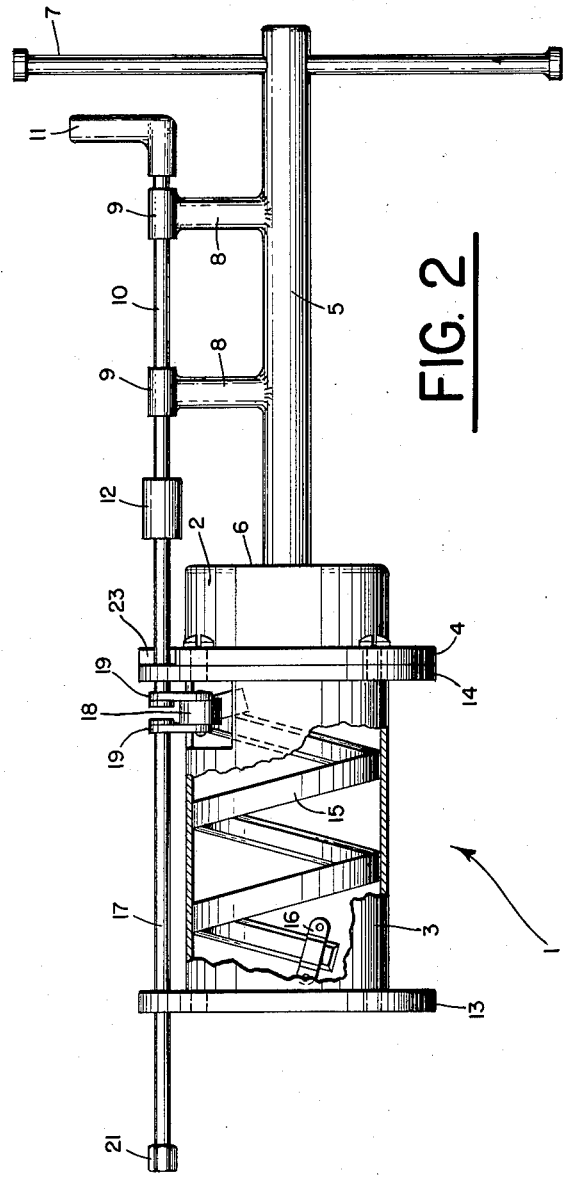
FIG. 2 is a side elevation view, partly in section, of the embodiment of the invention.

Referring to FIGS. 1 and 2 the embodiment of the invention is illustrated and may be referred to as a friction tool or wrench 1. An end body section 2 and reversible body section 3 are combined in a manner to be described hereinafter to form a single unitary device. End section 2 is provided with a flange 4 disposed adjacent the open end and rod member 5 extends axially from the closed end wall 6 thereof. The torque handle 7 extends transversely to the axis of rod member 5. A plurality of upright supports 8 with hollow cylindrical bearing members 9 provide for the disposition of a cam shaft 10 extending coaxially to the rod member 5. One end of shaft 10 is provided with a handle 11 while the opposite end is provided with a coupling socket 12 having a hexagonal or may other desired configuration.

The reversible section 3 of a hollow tubular configuration has flanged members 13 and 14 disposed adjacent to the ends thereof. Circumferentially and internally disposed within body section 3 is a flexible friction-bearing member 15 arranged in a helical configuration. One end of the helix member is permanently secured by conventional means 16 to the inner wall of body section 3. The opposite end is permitted to be freely disposed and will be held in positive engagement with the cylindrical object on which the work is to be performed by structure to be described herein. The flexible friction-bearing member 15 may desirably be selected of a material having good holding qualities on smooth metallic surfaces; such as a V-belt of a rubberized composition having a flat and a beveled surface.

Within apertures defined in flanges 13 and 14, a rod member 17 is supported with said rod bearing an intermediate pivotally mounted roller cam member 18 supported by arms 19 secured thereto. An opening 20 is provided in the body section 3 to permit engagement of the free end of the helix member 15 by the roller cam member 18. Movement of the cam member will apply a compression force to the free end of the helix to thereby permit positive engagement of the smooth surfaces of the cylindrical object on which the work will be performed.

Rod member 17 is provided with coupling heads 21 and 22 having a hexagonal or any other desired configuration at the ends thereof and the overall rod member is aligned to meet with and engage cam shaft 10. It may be noted that a notch 23 may be provided in flange member 4 to accommodate the engagement of the rod member 17 and cam shaft 10.

Turning now to FIG. 3 the manner of assembling the embodiment of the invention will be described. The body sections 2 and 3 will be assembled in the manner illustrated with either hexagonal head 21 or 22 introduced through slot 23 in flange 4 to engage socket 12. Flanges 4 and 13 or 14 will then be in abutting relationship and each flange is provided with match marks "1" and "2" diametrically disposed in the manner illustrated. Such markings will assist the user in positively identifying the direction in which the torque is to be applied. The flanges may then be joined together with conventional hardware introduced through threaded or clearance holes 24 in the manner well known in the art.

Having thus described the pertinent structure incorporated in an embodiment of the present invention a description of its usage follows to illustrate the utility of the device in the application of torque forces in any desired direction. It may be noted that match marks

"1" and "2" are etched or otherwise affixed to the flanges in an opposite relationship. When the torque direction to be applied to a smooth cylindrical object is in one direction, for example clockwise with respect to handle 7 as viewed in FIG. 3 the device will have been assembled with the match mark "1" on flange 14 coinciding with a similar number on flange 4.

The assembled device is then mounted directly on the object to be handled and cam shaft handle 11 may be rotated in the direction in which the torque is to be applied to thereby move roller cam 18 in position to exert a compression force on the free end of the helix member 15. The torque forces may then be applied to the handle 17 in the appropriate direction with the result that the helix member seizes or grips the smooth cylindrical surfaces more positively and securely as increasing torque forces are applied. After removal of the object the device will be released from its gripping relationship simply by counter-rotation of the handle.

Since body section 3 is separable and easily reversible it is a simple matter to disengage it from end section 2 and having hexagonal head 21 engage socket 12 with flange 13 in abutting relationship with flange 4 to apply a torque in the opposite direction. The handle 7 would then be rotated in a direction counter clockwise with relation to the view referred to. In each instance a positive control adjustment will be made to bring the roller cam 18 in the appropriate position to exert the compression forces between the helix member 15 and the surfaces of the object being handled. Such action firmly secures the flexible member against the smooth wall surfaces to thereby prevent any slippage or misalignment.

A modification of the present invention, shown in FIG. 4, permits assembly of the device on cylindrical objects mounted in inaccessible locations wherein removal operations must be performed from a side or top position. In such instances the separable and reversible body section 3 may be constructed in two longitudinal half sections indicated as 3a and 3b. The flexible member which is secured at 16 to one of the halves may be formed in the helical configuration on the cylindrical object and the two half sections assembled and secured surrounding the same, as by providing flanges 25 on each half and securing the flanges together by bolts 26. The end section 2 in this embodiment of the invention may be provided with a suitable handle and cam shaft arrangement which extends radially Torque forces may then be applied to the assembled reversible and end body sections with the roller cam member in contiguous relationship with the helix member.

Numerous other alterations and modifications may be practiced, such as adjusting the internal wall configuration of the body sections to conform to alternate sizes and contours. In addition the lengths of the body sections may be altered to adapt to varying overall lengths of objects to be handled. Flange fastening means, such as spring-actuated clamps, may also be easily adapted to the embodiment to facilitate speedy coupling and disengagement procedures in the assembly of the body sections. While specific illustrative embodiments have been described herein, it is intended that such matter be accorded an interpretation consonant with the spirit and tenor of the invention as defined in the appended claims.

I claim:

1. A handling device for performing work on objects having smooth exterior surfaces comprising a separable body section defining a central hollow passageway adapted to receive the object on which the work is to be performed, a flexible helically wound friction-bearing member disposed adjacent to the wall surfaces of said passageway, a roller cam member externally mounted on said body section, wall structure defining an opening in said body section dimensioned to expose a portion of said flexible member and to receive said roller cam member, an end body section adapted to abut and be joined to said separable body section, said end section defining manually operable means for the application of a torque force and means for the control and displacement of said roller cam member after the body sections have been joined to exert a compression force upon the exposed portion of said flexible member.

2. A handling device for performing work on cylindrical objects and the like comprising a separable hollow tubular body section defining a central passageway, a flexible helically wound friction-bearing member positioned adjacent to the wall surfaces of said passageway with one end thereof secured to said wall surfaces, a roller cam member pivotally mounted on external support means on said body section, wall structure defining an opening in said body section dimensioned to expose the free end of said flexible member and to receive said roller cam member, a cylindrical end body section adapted to abut and be joined to said separable body section, said end section defining manually operable means for the application of a torque force and means for the control and displacement of said roller cam member after the body sections have been joined to exert a compression force upon the exposed free end of said flexible member.

3. A handling device according to claim 2 wherein said separable and end body sections each have flange members disposed adjacent an end thereof with said flange members mating and abutting each other.

4. A handling device according to claim 2 wherein said roller cam member support means comprise a rod member with the ends thereof extending beyond the ends of said separable body section, a coupling member of predetermined configuration supported at the rod ends adapted to mate with a member of similar configuration disposed at the end of said control and displacement means defined by said end body section.

5. A handling device according to claim 2 wherein said separable body section is defined by two longitudinal half sections.

6. A handling device for the application of a torque force in any desired direction to objects having smooth exterior surfaces comprising a reversible and separable body section defining a central hollow passageway adapted to receive the object on which the force is to be applied, a flexible helically wound friction-bearing member disposed adjacent to the wall surfaces of said passageway, said body section having flange members disposed adjacent to the ends thereof, a rod member carried by said flange members and defining at the ends thereof coupling members of a predetermined configuration, a roller cam member pivotally mounted on said rod member, wall structure defining an opening in said body section dimensioned to expose a portion of said flexible member and to receive said roller cam member, an end body section having disposed adjacent an end thereof a flange member adapted to mate with and be joined to either of the flange members on said reversible and separable body section, said section defining manually operable means for the application of a torque force and means cooperating with said coupling members to define a rotatable control member to displace said roller cam member after the body sections have been joined to thereby exert a compression force upon the exposed portion of said flexible member.

7. A handling device according to claim 6 wherein said reversible and separable body section is defined by two longitudinal half sections.

8. A handling device according to claim 6 wherein said coupling members extend beyond the plane of said flange members on said reversible and separable body section.

9. A handling device according to claim 6 wherein said flexible member is anchored at one end to the wall surfaces of said passageway and freely disposed at the opposing end adjacent to the body section opening.

10. A hand tool for the application of a torque force to objects having smooth exterior surfaces comprising a sectionalized body member having a first reversible and separable section abutting and joined to a second end section, said first section defining a central hollow passageway with a flexible helix member of a friction-bearing material disposed adjacent to the wall surfaces thereof, mating flange members disposed adjacent to opposing ends of said first section and one end of said second section, a tubular member supported by and extending axially from the flangeless end of said second section, means for rotation of said tool disposed transversely from said tubular member, an elongated rotatable shaft member extending coaxially to said tubular member and defining at one end a coupling member of predetermined configuration, a rod member extending between the flange members of said first section and defining at the ends thereof a plurality of coupling members adapted to mate with the first mentioned coupling member, a roller cam member pivotally mounted on said rod member and adapted to rotate upon actuation of said rotable shaft member, wall structure defining an opening in said first body section to expose a portion of said helix member and receive said roller cam member to thereby exert a compression force upon the exposed portion of said helix member to grip and move an object disposed within the hollow passageway when the tool is rotated.

11. A hand tool according to claim 10 wherein said helix member is anchored at one end and freely disposed at the opposing and adjacent to the opening in the first section.

12. A hand tool according to claim 10 wherein said first section is defined by two longitudinal half sections.

References Cited in the file of this patent
UNITED STATES PATENTS

| | | |
|---|---|---|
| 850,869 | Huntley | Apr. 16, 1907 |
| 1,467,535 | Despres | Sept. 11, 1923 |
| 1,916,554 | Bevington et al. | July 4, 1933 |
| 2,718,800 | Olson | Sept. 27, 1955 |
| 2,805,590 | Nelson | Sept. 10, 1957 |
| 2,959,994 | Kile | Nov. 15, 1960 |